S. T. ALLEN.
TRACTOR.
APPLICATION FILED JUNE 7, 1917.

1,290,475.

Patented Jan. 7, 1919.
3 SHEETS—SHEET 2.

INVENTOR:
Sherman T. Allen
Westall and Wallace
His Attorneys

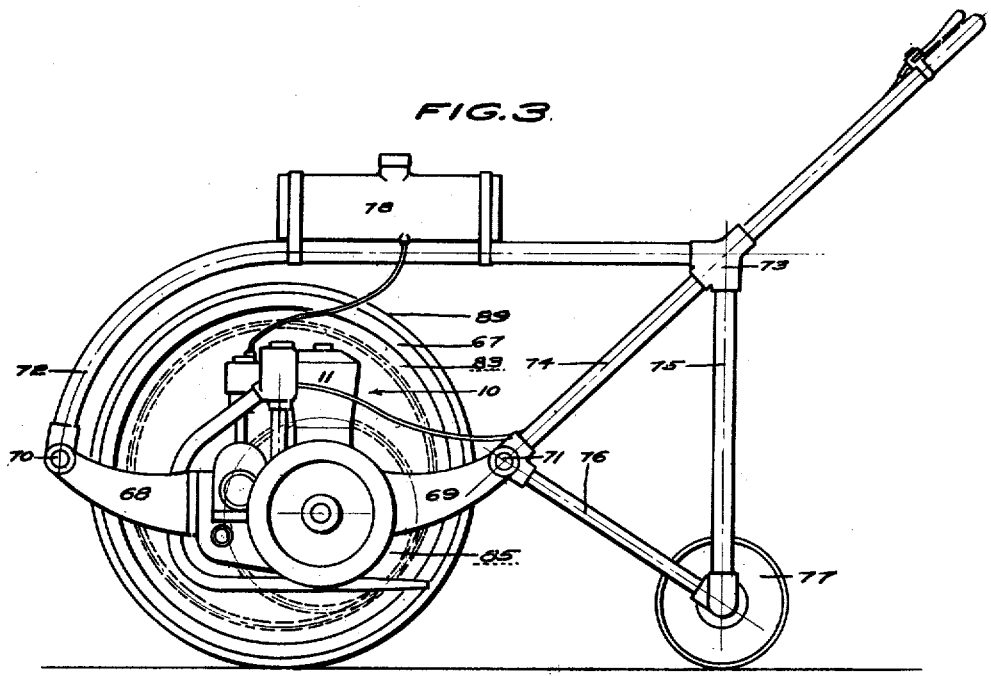
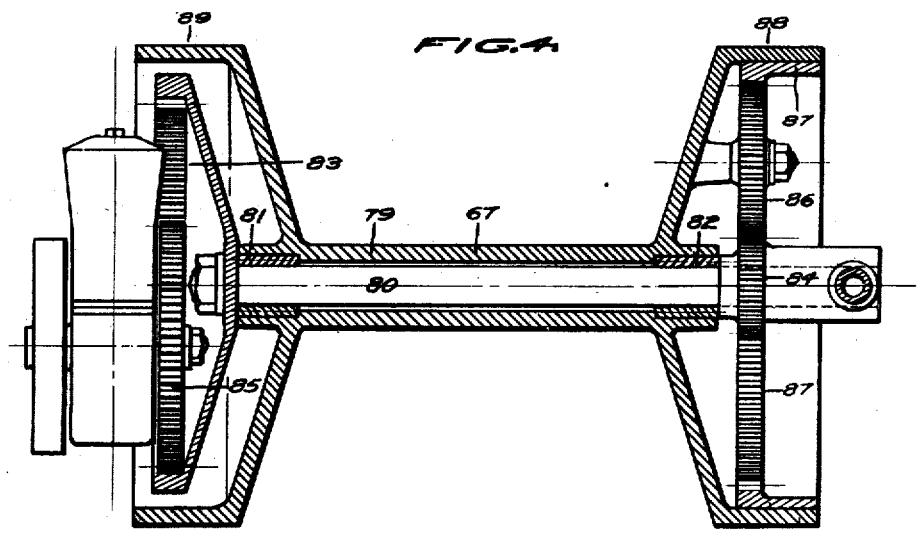

UNITED STATES PATENT OFFICE.

SHERMAN T. ALLEN, OF BURBANK, CALIFORNIA.

TRACTOR.

1,290,475.  Specification of Letters Patent.  Patented Jan. 7, 1919.

Application filed June 7, 1917.   Serial No. 173,411.

*To all whom it may concern:*

Be it known that I, SHERMAN T. ALLEN, a citizen of the United States, residing at Burbank, in the county of Los Angeles and State of California, have invented new and useful Improvements in Tractors, of which the following is a specification.

This invention relates to a tractor and particularly pertains to a combined tractor and farm implement.

It is the principal object of this invention to provide a farm implement which is compact in its design and within which is incorporated a tractor embodying a power plant and traction means for drawing the farm implement.

Another object of this invention is to provide a device of the above character which requires the use of a small inexpensively operating internal-combustion engine and is so constructed that the completely assembled device may be followed by the operator and managed in the same manner as a horse drawn cultivator, or other farm implement.

Another object of this invention is to provide an implement which is comparatively inexpensive in manufacturing cost and is made from a minimum number of simply designed parts which may be rapidly constructed in duplicate and therefore provides an implement having a wide range of usefulness, as well as being easily assembled and operated.

Another object of this invention is to provide a farm implement of the above class which is not liable to become broken or otherwise rendered inoperative, and which may be operated and controlled, as well as repaired by those who are not especially versed in mechanics.

Another object of this invention is to provide a farm implement of light construction which is fitted with means whereby it may be easily weighted to provide suitable traction for the driving wheels.

Another object of this invention is to provide means whereby agricultural tools may be interchangeably secured upon the device and thereafter may be shifted to accommodate the rows of vegetation.

It is a further object of this invention to provide a motor propelled farm implement formed of few parts and which may be easily controlled to cultivate the soil or may be used for other traction purposes without difficulty.

Other objects will appear hereinafter.

The invention is illustrated, by way of example, in the accompanying drawings in which:

Fig. 3 is a view in side elevation illustrating a modified form of the device, embodying a change in the hanging of the motor and the power transmission.

Fig. 4 is a view in longitudinal section and elevation disclosing the transmission reduction mechanism of the modified form of the device.

Figure 1:
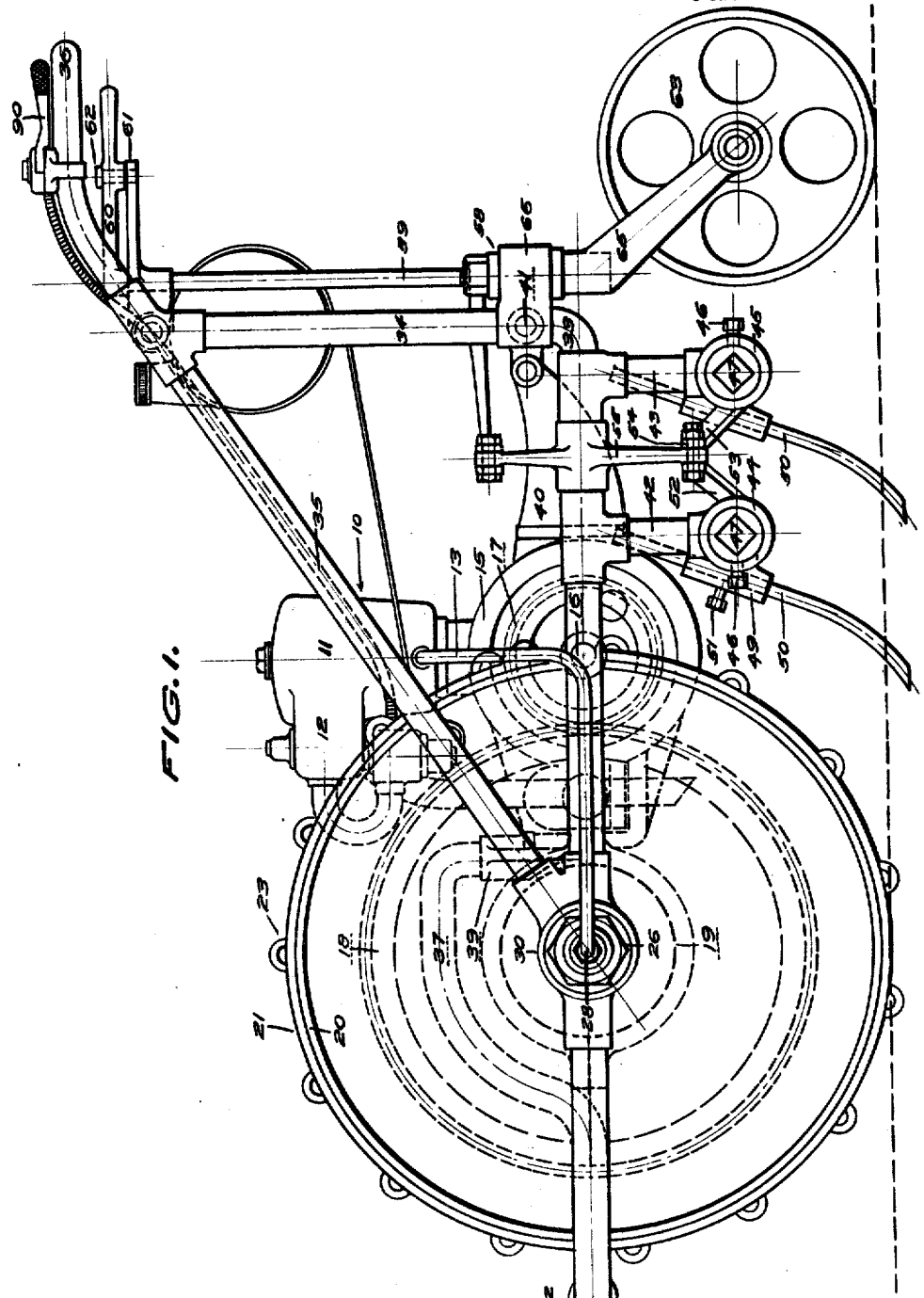
Figure 1 is a view in side elevation illustrating the assembled tractor and farm implement.

Referring more particularly to the drawings, 10 indicates an internal-combustion engine, here shown as having a single cylinder 11. This cylinder is inclosed within a water jacket 12 which is supplied with a circulation of water through an inlet pipe 13 and an outlet pipe 14. The engine is fitted with a suitable flywheel 15 which is mounted upon its crank shaft 16. Secured at the end of the shaft 16 is a driving pinion 17 adapted to mesh with a large driving gear 18. The gear is secured around the spindle 19 which is formed integral with wheel flanges 20 and 21. The spindle and flanges are substantially the shape of a spool and are cast integral to form a hollow casting. The flange ends of the casting are formed with traction treads 21 and 22. These treads are flat and have a series of gripping protrusions 23 upon them. It will be understood that this entire wheel unit is of metal and has its ends inclosed to form a large reservoir. This reservoir is provided with an opening 24 which is normally closed by a screw cap 25. The reservoir may be filled with water, when desired, to add weight to the wheel structure and increase the traction of the wheel treads upon the ground. Extending outwardly from the opposite ends of the wheel unit are stub shafts 26 and 27. These shafts are cylindrical and also tubular. The opened ends of the shafts are fitted with swivel pipe unions 28 and 29 adapted to receive the ends of the water circulation pipes 13 and 14. In this manner a circulation of water may be produced through the engine and the large water reservoir within the wheel unit. It may be considered necessary to aid the thermo-siphon circulation by positive acting means, in which case a pump may be interposed along the path of circulation.

Figure 2:
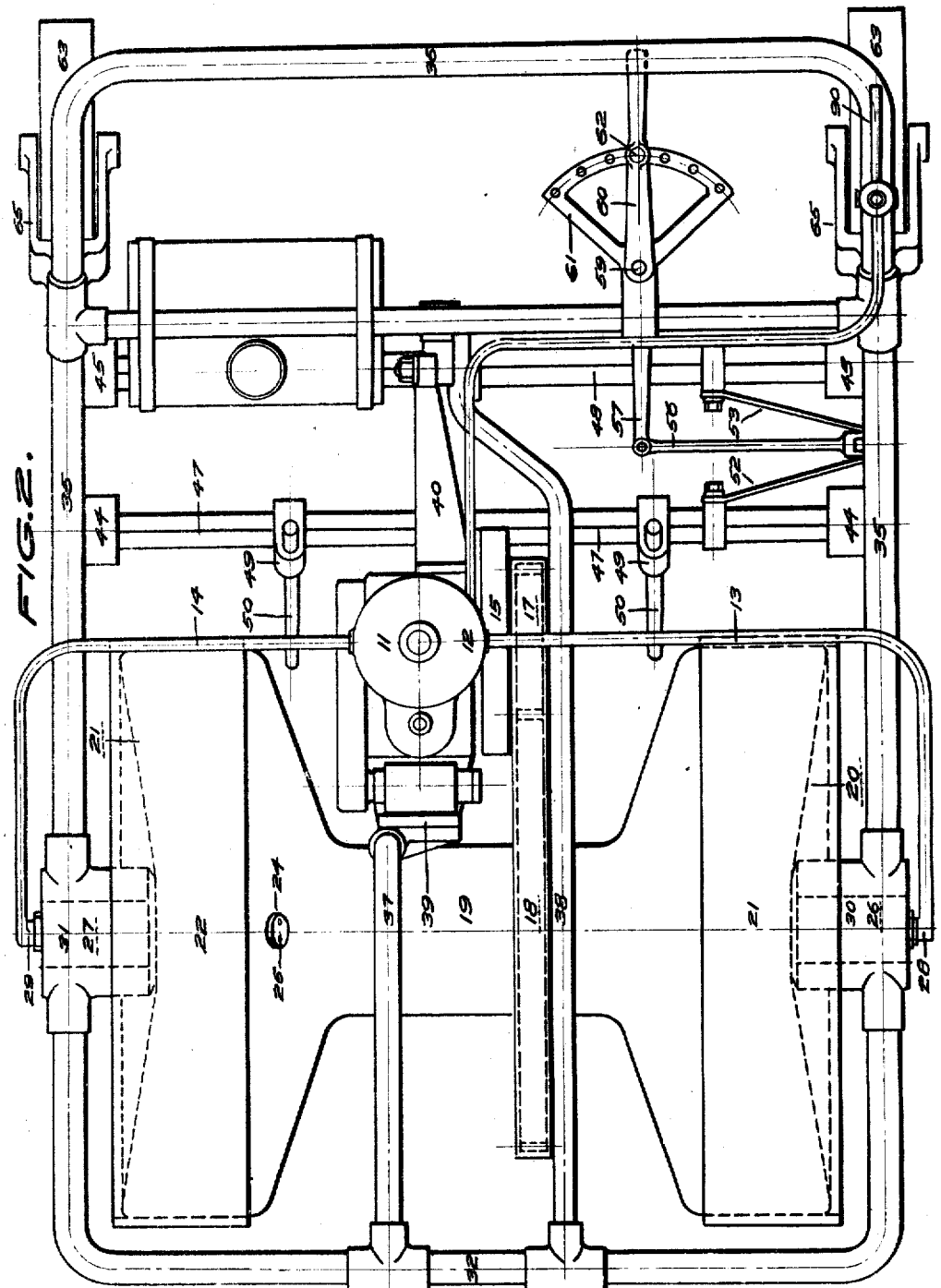
Fig. 2 is a view in plan illustrating the device as shown in Fig. 1 and particularly disclosing the disposition of the power plant to the traction wheels and frame.

The stub shafts 26 and 27 are rotatably secured within bearings 30 and 31. These bearings form a part of the frame structure and provide permanent mountings for the frame members. As shown in Fig. 2 a transverse front frame member 32 is connected at its opposite ends to the bearings 30 and 31. This frame member is U-shaped and extends across the front of the wheel unit and rearwardly along the opposite ends. A horizontal side 33 extends rearwardly from each of the bearings and connects with a vertical frame member 34. This member, in turn, is united with an inclined frame member 35 which is likewise secured, one in each of the bearings. A transversely extending handle bar 36 connects with the frame members 35 at their juncture with the vertical members 34. The frame structure, as described, provides a main frame for the entire implement. A motor frame is also provided. This is composed of a front motor hanger 37 and a rear motor hanger 38, both of which are secured by their forward ends to the transverse frame member 32. These hangers are both bent to bridge the spindle 19 of the wheel. The hanger 37 connecting with a bracket 39 at the front of the motor, and the hanger 38 connecting with the bracket 40 at the rear of the motor. The hanger 38 also is suitably tied to a transverse reinforcing bar 41. In this manner the motor and frame may be swung vertically in relation to the wheel unit without difficulty.

Secured to the horizontal side frame members 33 and extending downwardly therefrom are cross-bar supports 42 and 43. These supports are fitted with bushings 44 and 45 which may be rotatably adjusted and locked by set screws 46. Square holes are formed through the bushings to receive implement supporting bars 47 and 48. It will be understood that these bars are adapted to be slid transversely of the frame and that they are fitted with sockets 49 adapted to receive agricultural tools, as indicated by the numeral 50. Set screws 51 are provided to hold the tools within the brackets.

The two sliding bars 47 and 48 are connected by means of straps 52 and 53 which are secured by a bolt 54 to the lower end of a shifting bar 55. This bar is rotatably mounted upon one of the side frame members 33. The upper end of the lever is provided with an arm adapted to be engaged by a link 56 which connects with an oscillating arm 57. The arm 57 is pivotally secured to swing horizontally on a bracket 58 and is controlled by the rotation of a shaft 59 which is swung by a lever 60. The hand lever 60 swings over a ratchet quadrant 61 and is provided with a pawl mechanism 62 by which it may be locked in any desired position. The rear portion of the frame and the implement bars are supported by caster wheels 63 and 64, each of which are fitted with swivel forks 65 pivotally mounted within brackets 66.

Reference being had to Figs. 3 and 4 it will be seen that the engine 10 is mounted at one end of the wheel unit 67. In this case the engine is provided with front and rear hangers 68 and 69 which are secured to transverse bars 70 and 71. The forward bar 70 is fitted with over-hanging frame members 72 which are led up over the front of the wheel and then horizontally and rearwardly to pipe fittings 73. The bar 71 is in connection with inclined frame members 74 which also are secured within the fittings 73. This bar is also provided with downwardly inclined frame members 75 which unite with vertical frame members 76 to form a support for follower wheels 77. The over-hanging frame members 72 also support a gasolene tank 78.

The wheel unit 67 is formed with a central tubular spindle 79 through which a drive shaft 80 is positioned. This drive shaft is mounted within the opposite ends of the spindle within anti-friction bearings 81 and 82. One end of the shaft 80 is fitted with a large internal gear 83 while the other end is provided with a pinion 84. The internal gear is in mesh with a driving gear 85 secured upon the engine shaft 16. The pinion is in mesh with an idler 86 which in turn meshes with an internal gear 87 secured around the inner face of the wheel tread portion 88 of the wheel unit. The gear 83 is inclosed within a tread portion 89 of the wheel unit. It will be understood that the frame of the vehicle, as shown in Fig. 4, supports the engine and also the wheel element so that they may be handled in a convenient manner.

In the operation of the preferred form of the invention, the engine is started, and when started is thereafter controlled by a fuel throttle lever 90 mounted upon the handle bar 36. Rotation of the engine shaft will drive the gear 17 and the gear 18 which is secured around the spindle 19 of the wheel unit. This actuation will cause rotation of the wheel unit and produce a movement of the vehicle. The reservoir within the wheel may be filled with a given quantity of water to add the desired weight, and produce suitable traction. As the implement advances it may be guided by swinging the frame by means of the handle bar. When desired, the hand lever 60 may be swung and this will act through the shaft 59 to reciprocate the squared shafts 47 and 48 and simultaneously shift the cultivating tools in relation to the wheels and frame of the structure.

In the modified form of the invention, operation of the engine will rotate the gear 85, which in turn will drive the internal gear 83. This gear transmits its motion to the shaft 80 and thereafter produces a rotation of gears 84, 86 and 87. As the gear 87 is secured directly to the wheel unit, the device may be driven. It will be understood that while a mounting for various agricultural implements is not shown in the modified form of the invention, the frame may be readily adapted to such a use, as illustrated in the preferred form.

It will thus be seen that the device here shown is simple in construction and operation and provides a small farm tractor of useful design which may be operated in an inexpensive manner to produce the results hereinbefore set forth.

While I have shown the preferred construction of my tractor as now known to me, it will be understood that various changes in the combination, construction and arrangement of parts may be made by those skilled in the art without departing from the spirit of my invention.

I claim:

1. A tractor comprising a pair of traction wheels, a tubular spindle with which said wheels are cast integrally to form an hour glass type of wheel, a frame upon which said wheel casting is rotatably mounted, and a power plant for propelling said wheels.

2. A tractor comprising a pair of traction wheels, a tubular spindle with which said wheels are cast integrally forming therewith a reservoir of hour glass form for fluent ballast, a frame upon which said wheel casting is rotatably mounted, and a power plant adapted for propelling said wheels.

3. A tractor, comprising a pair of traction wheels, a tubular spindle with which said wheels are cast integrally, a water reservoir formed within said wheels and spindle, a frame upon which said wheel casting is rotatably mounted, a power plant adapted to propel said wheels, and means whereby a circulation of water may be maintained through the water jacket of the engine and the water reservoir within the wheel casting.

In witness that I claim the foregoing, I have hereunto subscribed my name, this 1st day of June, 1917.

SHERMAN T. ALLEN.

Copies of this patent may be obtained for five cents each, by addressing the "Commissioner of Patents, Washington, D. C."